US012637279B2

(12) United States Patent
Hermann, Jr.

(10) Patent No.: US 12,637,279 B2
(45) Date of Patent: May 26, 2026

(54) SYSTEM AND METHOD FOR PRESERVING FOOD DURING STORAGE AND TRANSPORTATION

(71) Applicant: Blundell, Hermann, Philipp Capital Management, LLC, Sealy, TX (US)

(72) Inventor: William J. Hermann, Jr., Sealy, TX (US)

(73) Assignee: Blundell, Hermann, Philipp Capital Management, LLC, Sealy, TX (US)

( * ) Notice: Subject to any disclaimer, the term of this patent is extended or adjusted under 35 U.S.C. 154(b) by 227 days.

(21) Appl. No.: 18/445,617

(22) Filed: Nov. 25, 2023

(65) Prior Publication Data

US 2025/0171217 A1     May 29, 2025

(51) Int. Cl.
*B65D 81/26*          (2006.01)
*B60P 3/20*           (2006.01)
*B65D 81/20*          (2006.01)

(52) U.S. Cl.
CPC ............ *B65D 81/2076* (2013.01); *B60P 3/20* (2013.01); *B65D 81/263* (2013.01); *B65D 81/266* (2013.01)

(58) Field of Classification Search
CPC ............. B65D 81/2076; B65D 81/263; B65D 81/266; B60P 3/20

USPC ................. 62/385, 387, 388, 420, 423, 424; 206/213.1; 220/592.01, 592.02, 592.03, 220/592.12, 592.13, 592.14
See application file for complete search history.

(56) References Cited

U.S. PATENT DOCUMENTS

| | | | | |
|---|---|---|---|---|
| 2,731,807 A | * | 1/1956 | Allyne ................. | B60H 1/3235 219/202 |
| 2,791,401 A | * | 5/1957 | Harslem ................... | B60P 3/20 62/387 |
| 2024/0229299 A1 | * | 7/2024 | Wilson ..................... | D01C 1/02 |
| 2025/0198645 A1 | * | 6/2025 | Conrad ................. | F24F 5/0046 |
| 2025/0229050 A1 | * | 7/2025 | Lin ........................... | F24F 8/60 |

* cited by examiner

*Primary Examiner* — Luan K Bui
(74) *Attorney, Agent, or Firm* — Competition & Technology Law Group, LLP

(57) ABSTRACT

A method and system in which an oxygen concentrator, which removes O2 from ambient air and exhausts the oxygen-depleted, nitrogen-rich air, is used in combination with an enclosed cargo storage or transportation container to replace the oxygen-rich ambient air within the container with nitrogen-rich ambient air that will retard spoilation of cargo that is prone to oxygen-induced spoilation, such as fruits and vegetables.

15 Claims, 3 Drawing Sheets

SYSTEM AND METHOD FOR PRESERVING FOOD DURING STORAGE AND TRANSPORTATION

FIELD OF THE INVENTION

The inventions herein described, depicted and claimed relate generally to systems and methods for preservation of food such as fruits and vegetables primarily during transit in trucks, but can also be utilized when the produce is stored in large containers, even if the truck or storage container is not air-tight. More specifically, the systems and methods relate to replacing ambient oxygen with nitrogen on a continuous basis.

BACKGROUND OF THE INVENTION

Ever since humans evolved from hunters and gathers, to mostly living on farms which supplied the majority of the family's food, to living primarily in urban areas such that trips to the grocery store have replaced trips to the family's larder, a reliable food supply has played a major role in this evolution of modern day supply and demand for food. In addressing issues of food security and sustainability, agricultural production has garnered considerable attention from researchers and policymakers, but food spoilage, storage, and transport have received much less attention.

Production and delivering food to the ultimate consumer or to the wholesale and retail locations enroute to the ultimate consumer, even in these modern times, remains subject to factors beyond human control. All food spoils. Some deterioration occurs through the spontaneous breakdown of complex organic molecules.

Food spoilage can be defined as a disagreeable change in a food's normal state. Such changes can be detected by smell, taste, touch, or sight. These changes are due to several factors—air and oxygen, moisture, light, microbial growth, and temperature.

When chemicals in food are exposed to oxygen in the air, their chemical composition changes and they begin to break down. Animal and plant tissues contain antioxidant molecules to prevent this from happening. Although these molecules can slow the rate of oxidation in our foods, left unattended, foods will lose their nutritional value as they begin to discolor and break down.

One very important cause of food spoilage is oxygen in ambient air. Because air is colorless, odorless, and tasteless, it is often taken for granted and sometimes forgotten as a cause for food spoilage. Ambient air typically consists of roughly 70% nitrogen, 20% oxygen, and 10% mixture of other gases. While oxygen is essential for life, it can have deteriorative effects on fats, food colors, vitamins, flavors, and other food constituents.

Oxygen can cause food spoilage in several ways. It can provide conditions that will enhance the growth of microorganisms; it can cause damage to foods with the help of enzymes; and it will cause general chemical oxidation. Some bacteria require oxygen for growth (aerobes) while others can grow only in the absence of oxygen (anaerobes). Many bacteria can grow under either condition and are called facultative anaerobes. Molds and most yeast that cause food to spoil require oxygen to grow. They can often be found growing on the surface of foods when air is present.

Certain enzymes that are naturally present in food are known as oxidizing enzymes. These enzymes catalyze (speed up) chemical reactions between oxygen and food components, and this leads to food spoilage. Although there are many oxidizing enzymes, two that can cause deterioration of vegetables are catalase and peroxidase. The browning of vegetables caused by these enzymes is often accompanied by off-flavors and odors.

Oxygen can also cause spoilage of foods spontaneously, by itself. Oxidative spoilage is the chief cause of quality loss in fats and fatty portions of foods. When lipids oxidize, short chain carbon compounds are formed; these compounds have very strong odors and flavors and are very undesirable and unacceptable. The off-odors resulting from this type of spoilage are unpleasantly sharp and acrid. Food with this condition is almost always discarded.

Another cause of spoilage of food meant for human consumption is microorganisms, which effectively compete with humans for limited and valuable food resources. Given access to unprotected foodstuffs, bacteria and fungi rapidly colonize, increase in population, and produce. Many microbes need oxygen to survive and particularly to multiply. Therefore, oxygen deprivation can also protect foodstuffs from spoilage due to microbe infestation.

During food transportation and distribution, perishable foods are particularly vulnerable to loss. This is true in the U.S., and is especially so in developing nations where access to adequate and reliable refrigeration, infrastructure and transportation can be a challenge, and where the scarcity of sufficient food in general is exacerbated by transportation spoilage. Even if not discarded before reaching the intended destination, perishable food shipments are wasted if rejected by the buyer. Even if these goods make it to market, they are often wasted because of shorter shelf lives due to the deterioration process that began during transportation.

Given that trucks may be enroute for several days, particularly at the Mexico/U.S. border crossing, for example, this is a significant problem. The same issues are encountered in rail cars and shipping containers.

Suffice it to say, the presence of oxygen around foods, and in particular fruits and vegetables, is a major concern, particularly during transportation. The most common way currently being used to combat this during transportation and storage is refrigeration. Large trucks of every size and shape that are equipped with refrigeration units for reducing the temperature within the truck load are ubiquitous. These generally work as intended, but suffer drawbacks. First, in hot or very hot conditions, the refrigeration units are able to reduce the temperature but may not maintain the interior temperature at a desired coolness. Second, although the temperature may be cool, the oxygen in the ambient air continues to cause deterioration, just at a slightly slower rate. Third, the rapid expansion of refrigerated transportation is posing an environmental issue.

The environmental challenge caused by booming global demand for cooling during transportation could be far greater than previously thought. It has been reported that due to changing demographics in the U.S. and elsewhere, the number of refrigerated vehicles on the road could feasibly reach 15.5 million by 2025, up from less than 3 million in 2013.

This will have a deleterious impact in this era of combating climate change. Indeed, concerns have also been expressed that if this growth in demand for refrigerated transportation of food occurs without new technologies being introduced, the adverse effect on air quality and climate change due to the expansion of refrigerated transportation to cool food during transport could be significant.

There are some static applications in which ambient air is forced out of confined spaces by nitrogen gas injection on a one time basis. Also there are O2 absorbent chemicals used inside covered pallets of fruits and vegetables. These applications are not suitable for transportation applications in which the food will be in the truck trailer, rail car of container for days at a time.

Therefore, there exists a need in the transportation and storage of food for new technologies that will provide reliable resistance to spoilage during transportation and storage.

BRIEF SUMMARY OF A PREFERRED EMBODIMENT

In a preferred embodiment, an oxygen concentrator, which is readily available in numerous sizes/capacities, is used to remove oxygen from the typical truck transportation and storage cargo space (which is enclosed but need not be airtight). These $O^2$ concentrators remove $O^2$ from ambient air in a continuous flow to use the 90%+ nitrogen stream they produce to slowly replace, then continually process, the air inside a tractor trailer full of produce of all sorts, extracting the $O^2$ and venting it to the outside. For example, an oxygen concentrator could be placed in a trailer and run at 40 lpm $O^2$ production or 200 lpm of $O^2$ free predominantly N2 gas continually processing and renewing the reduction of $O^2$ in the air surrounding the food.

The effect of refrigeration is slow but not prevent oxidation. Placing the cargo in an $N^2$ rich environment will partially reduce or eliminate the need and expense of refrigeration.

There are commercially available machines that extract O2 from ambient air which can be adapted for use in the applications described herein. See. e.g. those at the following websites (of which there are many available by conducting an internet search for "industrial size oxygen concentrators:

https://www.oxygenconcentratorsupplies.
    com/?msclkid=b32 dfca1b8f210b922f
    5983ac5362375
  https://atlantahyperbariccenter.com/product/industrial-
    oxygen-concentrator/
  https://www.atlascopco.com/en-us/compressors/prod-
    ucts/oxygen-generators For example, certain such machines concentrate the O2 from ambient air and deliver it to either medical needs of patients, or in a different configuration to the flame end of a welding instrument to intensify the flame. The second version, i.e. welding units, deliver the higher flow rates and are cheaper and smaller by far so they will probably be preferred for our adaptation. Of course, in those applications it is the O2 which is the desired element.

In other words, in the prior art applications using O2 concentrators, the O2 is separated from the ambient air, collected and used, and the other ambient air elements, such as the N2, is "discarded" (by return to the ambient air). In contrast, the applications herein described use the collected N2 and discard the O2.

DETAILED DESCRIPTION OF THE PREFERRED EMBODIMENTS

The embodiments hereinafter described are the embodiments preferred at this time, and are not intended to and should not be interpreted to limit the scope of protection provided by this patent. Many modifications to the embodiments shown and described are possible without departing from the inventive concepts disclosed, depicted and claimed, and terms that are used for various aspects and components of the preferred embodiments are not limiting.

Figure 1:
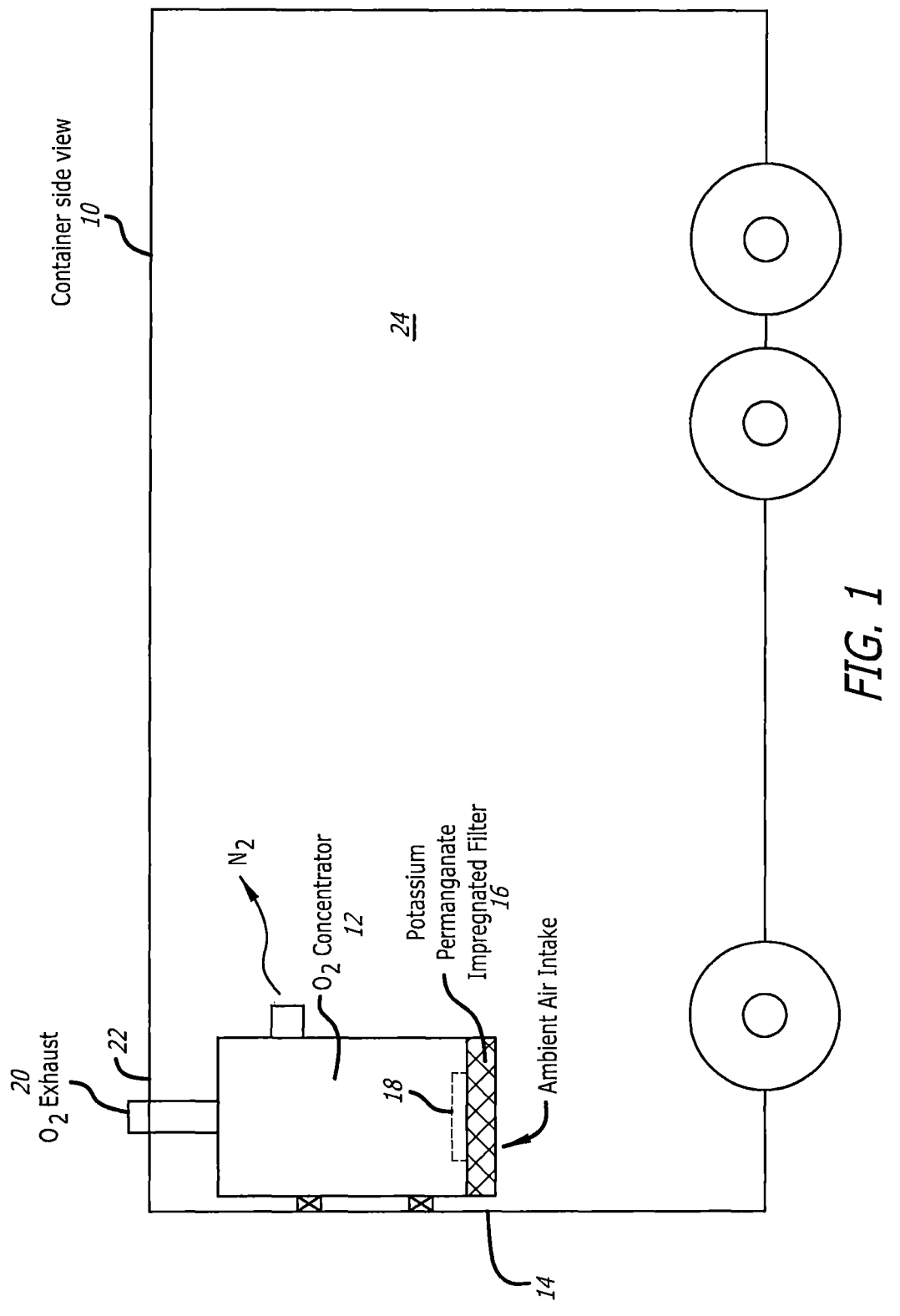
FIG. 1 shows in isolation a side view of a wheeled container in which the foodstuff will be loaded for transportation. In this embodiment, the O2 concentrator is affixed to the front wall of the container, and the O2 is expelled to the exterior of the container through an exhaust pipe extending above the container.

Turning to FIG. 1, a generic wheeled container 10 is shown in side view. As depicted, this container is of the kind typically used with a tractor trailer combination (tractor not shown), and would be of the kind typically used to transport fresh food in a refrigerated container. The trailer-container could be a separate unit that can be attached to and detached from the tractor, of could be fixed to the tractor. The container 10 could be of any type of container (refrigerated or not, and transportable or not) such as that shown or any other cargo container that is at least substantially sealed although not necessarily air-tight. These would include and not be limited to railcars, shipping containers and even storage sheds and the like. In use, the container 10 would be loaded with cargo comprising food that was subject spoilage, such as fruits or vegetables. The manner in which the cargo is loaded is not critical; but preferably will be loaded in such a way as to occupy a substantial portion of the available interior space of container 10 so that the amount of ambient air in container 10 is reduced, which will allow for a more efficient and effective replacement of the ambient air (with its O2 component) with air that includes a high percentage of N2 and a low percentage of O2.

As shown in FIG. 1, the O2 concentrator 12 is attached by any conventional means to the front wall 14 of the container 10. In this embodiment a potassium permanganate infused filter 16 is attached by any conventional means to the lower side of the concentrator 12, and the ambient air intake port 18 for the O2 concentrator 12 is located directly above the filter 16 so that the ambient air entering the concentrator 12 is first infused with potassium permanganate, which is useful to retard premature ripening and spoilage of most types of fruit. The use of the filter 16 is optional, and the inventions described and claimed herein are not limited to use of the filter 16 or the use of some other method or means of infusing the ambient air with potassium permanganate.

The concentrated O2 is expelled to the exterior of the container 10 via O2 exhaust port 20. The precise location of the port 20 is not critical, and can be any convenient location. Here it is shown extending from the top of the concentrator 12 through the top wall 22 of the container 10. The port can be preferably fitted with a conventional one-way valve (not shown) so as to prevent unwanted material from entering into the concentrator 12 through the port 20. By extending the O2 exhaust port 20 through the top wall 22 of the container 10, in transit the air rushing past the end of the port 20 will work to "pull" the O2 out of the concentrator 12.

Figure 2:
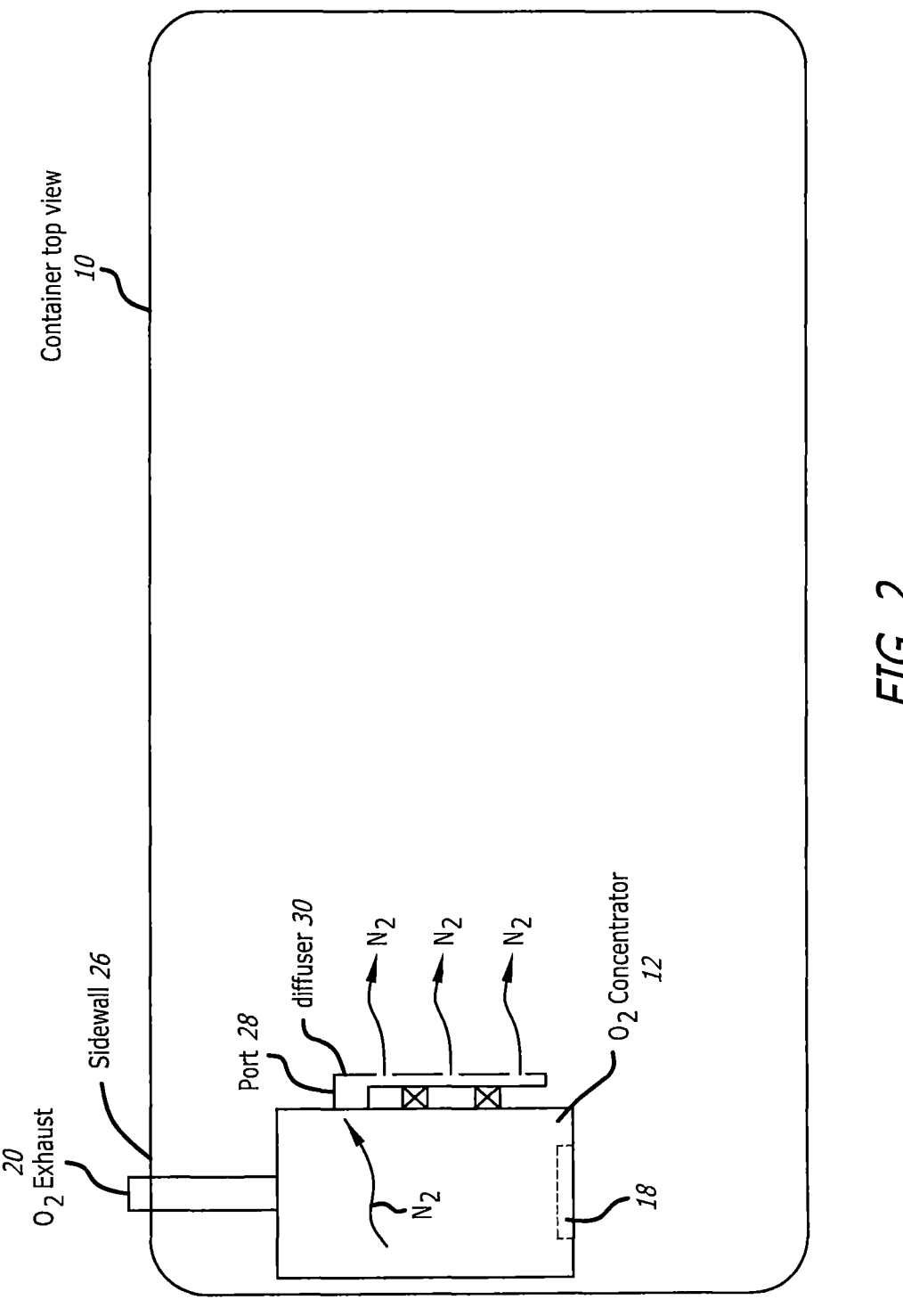
FIG. 2 shows a top view of a generic container in which the O2 concentrator is attached to the floor or the roof of the container, with the O2 exhaust through the side of the container.

As the O2 concentrator 12 is extracting the O2 from the ambient air, the remnant N2 is vented into the interior space 24 of the container 10. And as more N2 is vented into the container interior 24 the concentration of N2 in the container interior 24 increases, and as the cycle continues with air from the container interior 24 being drawn into the concentrator 12, whatever O2 remains being extracted, and more N2 being vented into the container interior 24, the concentration of N2 increases Turning now to FIG. 2, a similar arrangement of key components is shown, although here the filter 16 has been omitted, as it is not necessary in all applications, and is not required for the effectiveness of the claimed inventions. FIG. 2 shows a top view of the container 10, and shows that the concentrator 12 can be located on the floor of the container 10, with it intake 18 and O2 exhaust port 20 on the side, with the latter extending through the sidewall 26 of the container 10. In this embodiment, the N2 exits the concentrator 12 through exhaust port 28 into a diffuser 30. The diffuser 30 can be attached to the exhaust port 28 and the concentrator 12 in any conventional manner.

Figure 3:
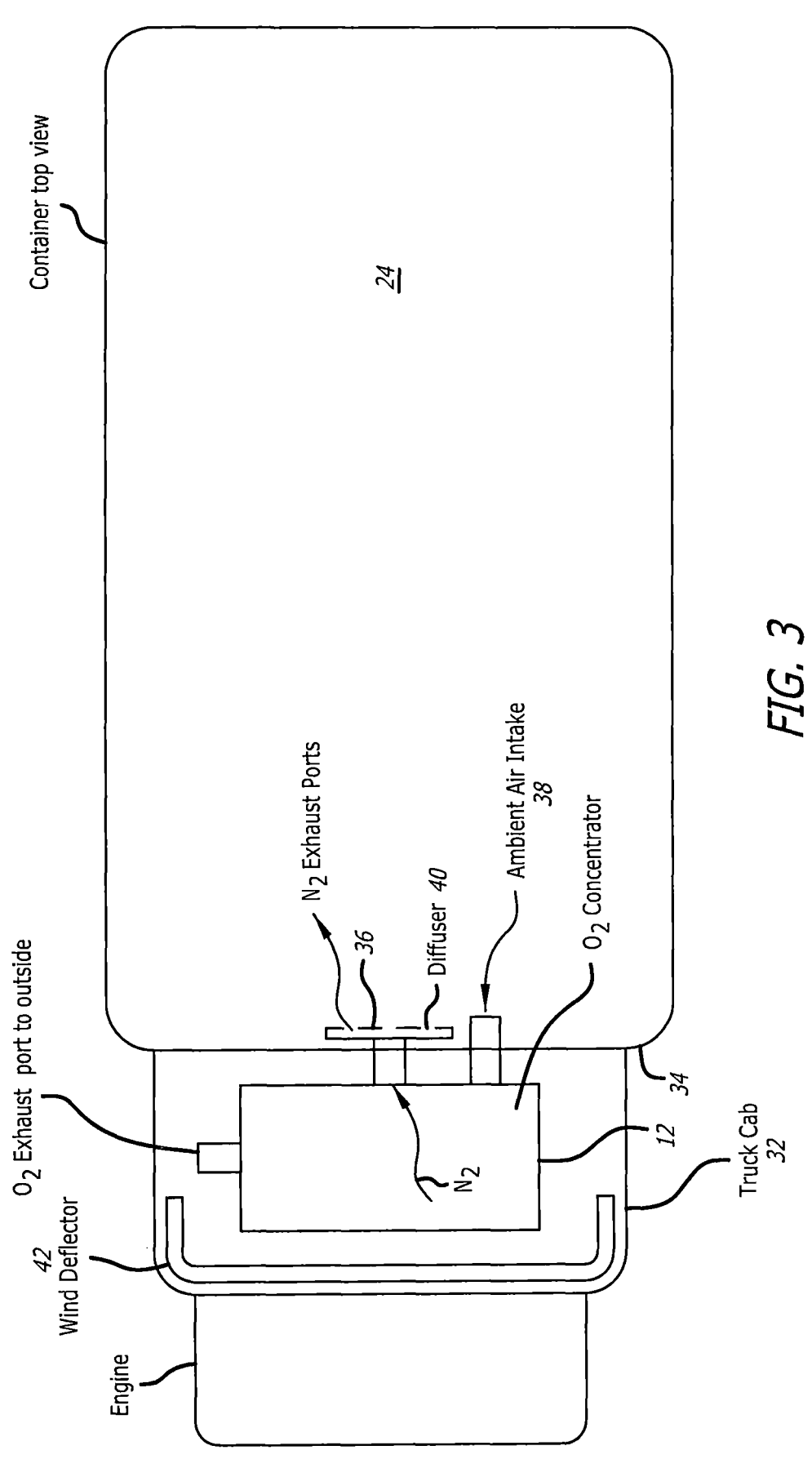
FIG. 3 shows a particular embodiment in which the container being transported by a semi-truck and trailer arrangement in which the O2 concentrator is attached to the exterior front wall of the container such that it is located above the truck cab. This Figure would also depict an embodiment in which the O2 concentrator is attached to the top of the truck cab and the N2 is vented into the container.

Turning now to FIG. 3, an embodiment is shown in which the concentrator 12 is not located within container 10, but is located outside container 10. In this embodiment, the system is used with a tractor 32 in which the container 10 can be a stand-alone trailer-type device that is attachable to one tractor, then detached for attachment to another tractor for the continuation of the journey to the cargo's destination.

In addition, the embodiment shown here could also represent a tractor-cargo-container arrangement in which the cargo container 10 would be permanently attached to the tractor 32. In this embodiment, the concentrator 12 could be attached to the front exterior wall 34 of the container 10 with the N2 port 36 communicating with the interior of the container 10 to deliver the extracted N2 into the area surrounding the cargo, and the ambient intake port 38 would allow the ambient air from the cargo space 24 in the container 10 to be drawn into the concentrator 12. A diffuser 40 could also be employed in this embodiment. The O2 extracted from the ambient air from the cargo space 24 would be expelled in to the atmosphere outside the container 10.

Another variation also represented by FIG. 3 would entail the concentrator 12 attached to the top of the truck cab 32 by conventional means, with intake of the ambient air from the cargo space 24, and porting of the N2 and O2 being the same as described above. In either case depicted in FIG. 3, a wind deflector 42 could be employed to deflect wind from hitting the concentrator 12 during transit.

It will be apparent to those skilled in the art that as shown in FIG. 3, the concentrator 12 can be located in many different locations within the container 10, and its intake and exhaust arranged in many different ways.

Depending on how air-tight the truck trailer or storage container is, O2 as part of ambient air outside the container 10 may leak into the container 10 over periods of days. The 40 lpm (liters per minute) version is considered a high capacity version of an oxygen concentrator drawing about 3 kwh of power. This amount of electricity may require some additional energy input depending on the circumstances.

For example, 53 Ft largest allowable tractor trailer has interior dimensions of 47.6 (L)×8.2 (W)×9.0 (H) which is just short of 32,650 liters of air empty, with the full produce pallets, would cause a full load displacement of approx. 70% of volume, leaving 9,795 liters of air. The processor removes and externally vents 40 liters per minute of O2 (typically 93% pure) from 200 lpm of air, leaving 160 lpm of N2 behind/vented into the interior of the trailer.

The entire air exchange of the 9,975 liters at 200 lpm, theoretically, will occur every 50 minutes which may be modified by imperfections in air flow within the trailer. Likewise, if the trailer was only 50% full capacity the N2 exchange of the 16,325 liters would occur every 102 min or 1.7 hours Some new ambient air would be pulled by the small vacuum created as the O2 is exhausted externally.

Distribution of the N2 would be enhanced by duct systems, inside the trailer, for example, along the inside ceiling edges of the trailer. The estimated 3 kw of electrical energy needed to run the processor would be taken off the generated energy for the other electrical functions in the truck or other powered source. These sources of power on commercial trucks can be many and varied, and the intended power source for this invention is any commercial power-generating device that provides sufficient power to properly operate the concentrator.

Although details about the preferred embodiments have been set forth above. It will be apparent to those skilled in the art that many different and additional embodiments could be used with the disclosed system and methods without departing from the inventive concepts disclosed, depicted and claimed. Therefore, the this patent is not limited to the disclosed embodiments, but is of the full scope of each of the following claims.

What is claimed is:

1. A system for retarding spoilation of cargo that is prone to oxygen-induced spoilation, the system including:
   a. a cargo container that is capable of storing cargo, the cargo container not being open-air to the surrounding environment;
   b. an oxygen concentrator that is operable to intake ambient air which includes both oxygen and nitrogen;
   c. said oxygen concentrator located within said cargo container in fluid communication with the ambient air with said cargo container;
   d. said oxygen concentrator being powered by any conventional means;
   e. said oxygen concentrator having an intake port through which the ambient air within said cargo container is drawn into said oxygen concentrator;
   f. said oxygen concentrator operable to separate oxygen from said ambient air and vent the oxygen to the exterior of said cargo container; and
   g. returning the now oxygen-depleted, nitrogen-rich air to an interior of said cargo container.

2. The system of claim 1 wherein said cargo container is substantially air-tight.

3. The system of claim 1 wherein said cargo container is attached to a vehicle that is capable of transportation.

4. The system of claim 1 wherein said cargo container is substantially air-tight.

5. The system of claim 1 wherein said cargo container is a stand-alone cargo container not capable of being transported.

6. The system of claim 1 wherein said oxygen concentrator is attached to an interior wall of said cargo container.

7. The system of claim 1 wherein said oxygen concentrator is attached to an exterior wall of said cargo container.

8. The system of claim 1 wherein said oxygen concentrator is attached to the ceiling of said cargo container.

9. The system of claim 1 wherein said cargo container is a rail car.

10. The system of claim 1 wherein said cargo in said cargo container consists of fresh fruits.

11. The system of claim 1 wherein said cargo in said cargo container consists of fresh vegetables.

12. The system of claim 1 which further includes a monitoring device for monitoring the oxygen content of the ambient air within said cargo container.

13. The system of claim 1 which further includes a monitoring device for monitoring the nitrogen content of the ambient air within said cargo container.

14. The system of claim 1 which further includes a refrigeration unit that cools the ambient air in said cargo container.

15. A method for retarding spoilation of cargo that is prone to oxygen-induced spoilation, the method including:

a. in a cargo container that is capable of storing cargo, the cargo container not being open-air to the surrounding environment, providing an oxygen concentrator that is operable to intake ambient air which includes both oxygen and nitrogen and to substantially remove the oxygen from the ambient air;

b. providing venting connected to said oxygen concentrator such that the oxygen-rich air is exhausted to the exterior of said cargo container, and the nitrogen-rich air is returned to an interior of said cargo container; and c. maintaining continuous operation of said oxygen concentrator such that oxygen content of the air within said cargo container is maintained to the desirable and pre-determined level during storage of the cargo in said cargo container.

\* \* \* \* \*